United States Patent [19]
Bjorklund

[11] 3,879,607
[45] Apr. 22, 1975

[54] METHOD OF MEASURING THE AMOUNT OF SUBSTANCE ASSOCIATED WITH A BASE MATERIAL

[75] Inventor: Carolyn Bjorklund, Palo Alto, Calif.

[73] Assignee: Measurex Corporation, Cupertino, Calif.

[22] Filed: July 8, 1974

[21] Appl. No.: 485,896

Related U.S. Application Data

[63] Continuation-in-part of Ser. No. 345,656, March 28, 1973, abandoned.

[52] U.S. Cl. ............... 250/252; 250/339; 250/341
[51] Int. Cl. ............................................... G01t 1/16
[58] Field of Search ........... 250/252, 339, 341, 349, 250/358, 359, 360

[56] References Cited
UNITED STATES PATENTS
3,597,616  8/1971  Brunton et al. ................. 250/341
3,757,122  9/1973  Bossen et al. .................. 250/358

*Primary Examiner*—James W. Lawrence
*Assistant Examiner*—Davis L. Willis
*Attorney, Agent, or Firm*—Flehr, Hohbach, Test, Albritton & Herbert

[57] ABSTRACT

One transmission wavelength such as 1.7 microns is used to measure wet end water weight of a paper making machine, the transmitted radiation having a transfer characteristic which is standardized by utilizing dry end basis weight measurements for establishing water weight. Variations caused by grade changes are also compensated.

7 Claims, 6 Drawing Figures

METHOD OF MEASURING THE AMOUNT OF SUBSTANCE ASSOCIATED WITH A BASE MATERIAL

CROSS REFERENCE TO RELATED APPLICATION

This application is a continuation-in-part of application Ser. No. 345,656, filed Mar. 28, 1973, and now abandoned, entitled "Method of Measuring the Amount of Substance Associated With a Base Material" in the name of the present inventor.

BACKGROUND OF THE INVENTION

The present invention is directed to a method of measuring the amount of substance associated with a base material. More particularly, it is related to measuring relatively high concentrations of water in a moving sheet of paper.

In the paper making process, it is very useful to know the moisture content in a moving sheet of paper at various points as it moves through the paper making machine. Moisture gauges for measuring the moisture content at the so-called dry end of the machine where moisture levels are normally less than 10% are well-known in the art. However, the techniques that are suitable for measuring moisture levels below 10% are not applicable to measurements at the so-called wet end of the machine where the moisture content is in the range of 40–70%. In fact, no reliable accurate means of measuring the wet end moisture directly has yet been devised.

An on-line measurement of moisture at the wet end of a paper machine is desirable for purposes of paper making control and machine troubleshooting. For control, deviations in wet end moisture may be eliminated before they reach the dry end by feeding control signals forward to the dryer section. This is a considerable advantage over moisture control from the dry end which is feedback in nature and must wait for the paper with an off target moisture to leave the dryer section before it is even detected. Consequently, considerable paper with off target moisture is made before the appropriate corrections to the dryer section are made to eliminate the off target moisture.

Troubleshooting is facilitated by a wet end moisture gauge which narrows down the area of a machine in which a problem may exist. For example, an unsatisfactory moisture profile at the dry end of the machine may be due to problems either in the dryer section or in the wet press section. With a moisture gauge at the dry end only, it is difficult to tell where the problem may be. However, with a moisture gauge at both the wet end and the dry end, the problem may be pin pointed.

In the past, a basis weight gauge at the wet end has been used in combination with a basis weight gauge and moisture gauge at the dry end to determine wet end moisture by subtractive techniques. Although this approach has some value for troubleshooting, it suffers from the time delay problem discussed previously when used for control. If a moisture gauge is also provided at the wet end in addition to a basis weight gauge, then the basis weight and moisture content of the paper may also be controlled on a real time basis from the wet end. It would be possible thereby to avoid the time delay necessitated by weight and moisture measurements at the dry end. Thus, it can be seen that the advantages of the wet end moisture gauge are very significant. Nonetheless, a suitable gauge has not been developed.

All known prior attempts at making a wet end moisture gauge have relied upon the use of dual wavelengths as described in U.S. Pat. No. 3,641,349 issued Feb. 8, 1972 to Erik B. Dahlin and assigned to the present assignee. Briefly, this approach uses a 1.8 micron reference beam which is relatively insensitive to absorption by water and a 1.9 micron beam which is sensitive to absorption by water. A ratio of the detected levels of the beams that have been transmitted through the paper is indicative of the water weight in the paper. However, for higher moisture levels and heavier paper weight, for example, above 40 pounds per 1,000 square feet, the 1.9 micron beam is virtually totally absorbed. Thus, the use of the absorption phenomenon due to molecular excitation is not suitable as a physical mechanism upon which to base a wet end moisture gauge.

OBJECTS AND SUMMARY OF THE INVENTION

It is an object of the present invention to provide a method of directly and immediately measuring water weight at high moisture levels and heavy basis weights.

It is another object of the invention to provide a method as above which utilizes a single measurement wavelength.

In accordance with the above objects there is provided a method for measuring the amount of substance associated with a moving base material where the substance is a significant proportion of the total weight of the base material. The substance has both radiation absorption and scattering characteristics. Radiation of a single selected band is directed at the material which is substantially insensitive to the absorption characteristic. The amount of radiation reflected from or transmitted through the material is measured and the received radiation is proportional to the amount of substance.

DETAILED DESCRIPTION OF THE PREFERRED EMBODIMENT

Figure 1:
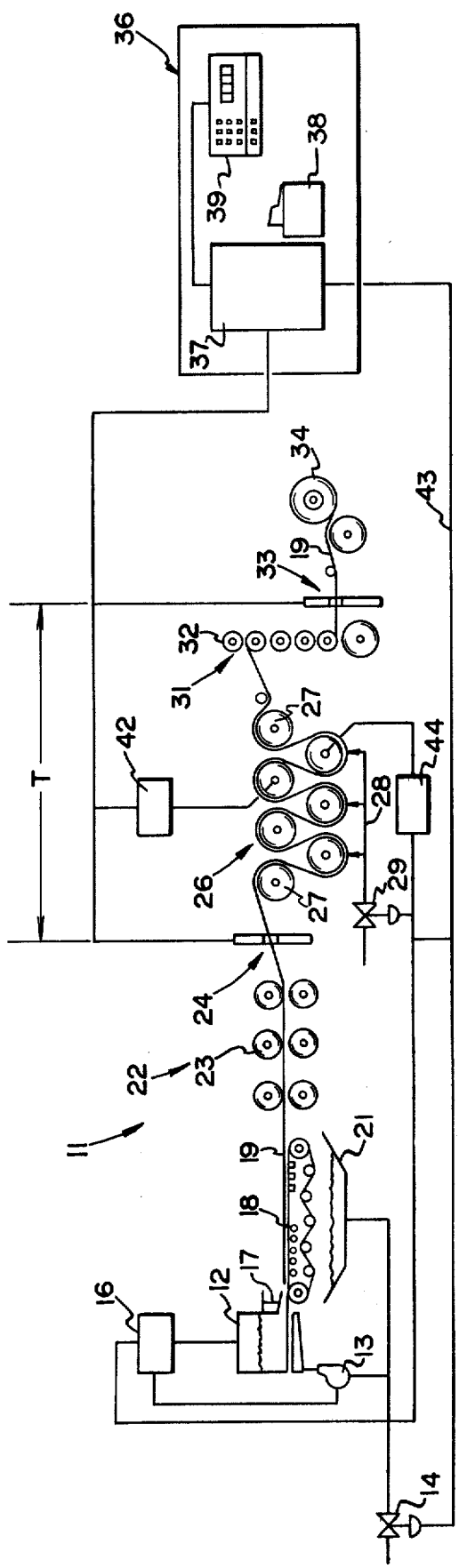
FIG. 1 is a schematic diagram of a paper making machine, along with associated control devices utilizing the method of the present invention.

The method of the present invention is illustrated in FIG. 1 as it is used with a conventional paper making machine 11. As is well known to those skilled in the art, such a paper making machine includes a headbox 12 which is supplied stock by pump 13 which is connected to a source of supply (not shown) through a stock valve 14. The headbox is controlled by headbox control 16 and delivers its output through slicers 17 onto an endless wire screen belt 18 in the form of a layer or web 19 which forms a continuous sheet of paper. Material which drains from the endless belt 18 is collected by a receptacle 21 and is returned to the headbox 12 by a pump 13.

After leaving the endless belt 18, the sheet of paper 19 passes through a press which consists of a plurality of rolls 23 which remove a substantial portion of the excess moisture in the sheet. Thereafter, this sheet travels through a scanner 24 which measures both the basis weight and moisture or water weight of the sheet of paper. This point in the paper making process is termed the wet end of the process since the percent of water in the paper still ranges from 40 to 70%. Measurement of this water content at the wet end is the objective of the present invention. Heretofore there has been no online and direct practical way of making such moisture measurement which is independent of the dry end, except for standardization of the measurement, and which provides an instantaneous measurement of moisture and basis weight at the wet end.

Continuing with the typical paper making process, after the sheet travels through rollers 23 and scanner 24 it passes through dryers 26 which consist of a plurality of drying cams 27 which are supplied with steam from piping 28 controlled by valve 29. The paper sheet then travels into a calender stack 31 where the paper is smoothed by a plurality of vertically disposed roller 32. The sheet of paper then travels through another scanner 33 after which it is wrapped in a large reel 34 which thereafter can be slit and cut into the desired lengths and then shipped to the user. Scanner 33 again measures both basis weight and moisture content. This scanner, however, is located at what is termed the dry end of the paper making process where the moisture content may range from 0 to 10%. The above-mentioned Dahlin patent discloses a typical moisture gauge suitable for the dry end. A basis weight gauge suitable for both the wet and dry ends and also a control system associated therewith is described in U.S. Pat. No. 3,757,122, issued Sept. 4, 1973, entitled "Basis Weight Gauging Apparatus, System and Method Using a Digital Count".

The foregoing patent discusses the control system which includes a production log station 36 which includes therein a digital processor 37 connected to a teleprinter 38. In addition, a digital output terminal 39 is connected to digital processor 37 which can be given real-time information in digital format regarding the measurements being accomplished. As will be explained in detail below, the digital processor 37 is supplied with information from the scanners 24 and 33 and in addition from tachometer 42 which measures the speed of rotation of one of the rollers 27. The output control line 43 from the digital processor thereupon provides appropriate control signals to indicated parts of the paper making machine including a speed control unit 44 for the rollers 27 and valves 14 and 29.

Figure 2:
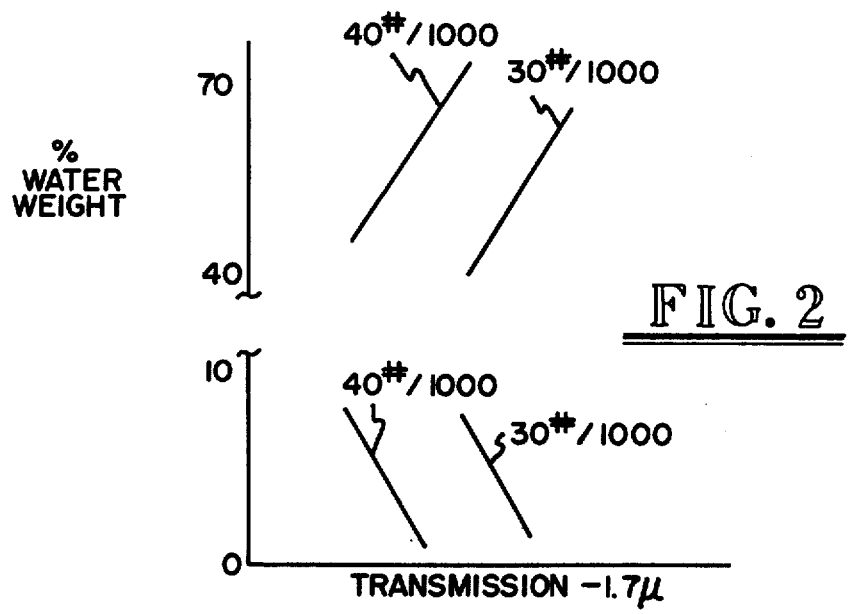
FIG. 2 shows characteristic curves useful in theoretically understanding the present invention.

FIG. 2 illustrates the transmission characteristics of the 1.7 micron band for paper sheet material of the indicated basis weights; that is, 30 pounds per 1,000 square feet (30lbs./1000) and 40 pounds per 1,000 square feet (40lbs./1000) at various percent water weights. From 0 to 10% the curves are a negative slope and somewhat linear. However, because of the great sensitivity required for accurate measurements, the ratio method is required for moisture measurements as disclosed in the the above Dahlin patent. On the other hand, from 40 to 70% water weight, water weight is definitely a linear function of transmission with the parameter of basis weight serving to displace the curves in a roughly parallel manner from one another for small shifts in basis weight. From a theoretical standpoint, the reversal of slopes from negative to positive is believed to be due to the fact that at higher water weights there is less scattering of the applied radiation. This is believed to be due to the larger size of water particles associated with the paper material and the effectively shorter path lengths of the radiation scattered by the larger size water particles. Such shorter path lengths make it more likely that the light will pass through the material without being absorbed.

Figure 3:
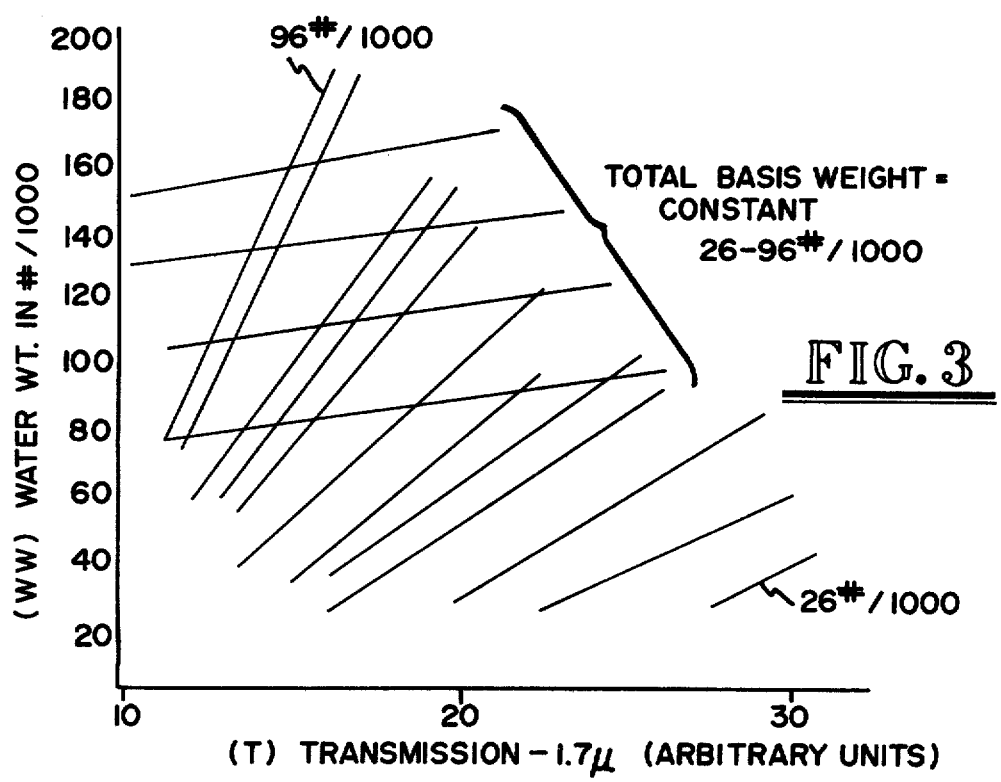
FIG. 3 shows characteristic curves useful for practicing the present invention.

The effect of basis weight on transmission is illustrated for a large range of bone dry basis weights in FIG. 3 which vary from a basis weight of 26 to 96lbs./1000. These curves are all at moistures of 40 to 70% or as expressed in absolute terms from 10 to 100 milligrams per square centimeter. The specific type of moisture gauge utilized for obtaining these curves is disclosed in U.S. Pat. No. 3,779,003 in the name of John J. Howarth, entitled "Apparatus for Measuring a Characteristics of Sheet Materials", assigned to the present assignee. Such a moisture gauge would when combined with the associated components of the Dahlin gauge as shown in the patent utilize only a single channel of 1.7 microns, rather than two channels. The technique shown in U.S. Pat. No. 3,821,553 in the name of John M. French, entitled "Dual Wavelength Moisture Gauge Having Automatic Gain Control", can also be used where a signal which is representative of the instantaneous gain of the automatic gain control circuit is generated. Other techniques would also be suitable such as merely using the output of a lead sulfide cell receptive to the 1.7 micron band and suitably amplified to avoid noise problems.

The family of curves of FIG. 3, each of them being linear, may be used to determine a derived set of curves which may be superimposed on those of FIG. 3. These superimposed lines correspond to constant total weight curves and provide additional information necessary for proper use of the wet end gauge. Specifically, the superimposed curves are constructed by merely choosing a convenient total basis weight and locating points on the original curves where the sum of the dry basis weight plus water weight equals the selected total weight. From FIG. 3, one can see that an error in the estimated bone dry weights or variations from point to point of the bone dry weight can cause errors in the calculated water weights. As described earlier, bone dry weight can never be accurately estimated at the wet end, since if this were known, water weight could accurately be determined by subtractive techniques. However, total weight is known accurately (from the wet end basis weight gauge), so the combination of the total weight from the weight gauge and the transmission signal for the wet end moisture gauge will uniquely determine water weight.

Figure 4A:
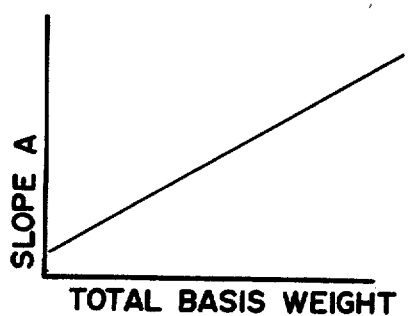
FIGS. 4A and 4B are curves derived from FIG. 3 and used in the method of the present invention.
Figure 4B:
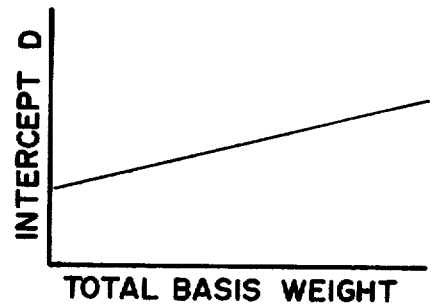

The superimposed family of curves with constant total weight as a parameter, each of them being linear, may be expressed in terms of slope (A) versus total weight as shown in FIG. 4A and intercept (D) versus total weight, as shown in FIG. 4B. The curves in FIGS. 4A and 4B are conveniently displayed as single linear functions of total weight, although nonlinearities may be easily included by making piecewise-linear curves. Thus for each total weight a unique slope (A) and intercept (D) may be determined which can be used to solve the equation:

$$WW = A * \text{Transmission} + D$$

or $$WW = A(TW) * \text{Transmission} + D(TW)$$

where A(TW) and D(TW) mean that A and D are actually functions of total weight and Transmission is the received 1.7μ radiation.

It is apparent as also will be obvious from the specific explanation of the method of the present invention below that with the use of the curves of FIGS. 4A and 4B that the large range of basis weights can be accommodated by the method of the present invention.

The initial curves shown in FIG. 3 are constructed off-line by making a range of samples of paper to be measured, for example, of 4.5 inch diameter. The samples are all placed in containers of water and left to stand for several hours. Next, each sample is dried in varying degrees so that a range of samples is constructed between 45 and 70% moisture in FIGS. 2 and 3.

Figure 5:
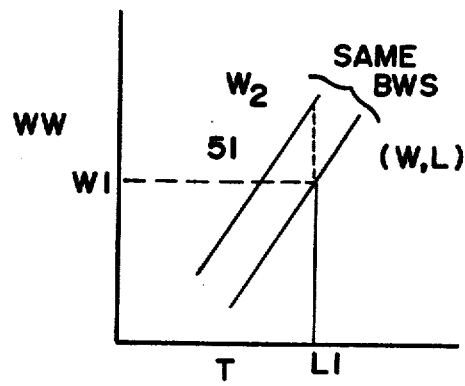
FIG. 5 shows additional curves useful in understanding the invention.

Two types of standardization are performed while the wet end moisture gauge is in operation. The first type is necessary for proper gauge performance and is done approximately every 10 scans while the system is off-sheet. A reading of the magnitude of the gauge signal is made and compared to that originally obtained when the gauge was initially put in operation. If the off-sheet signal has changed due to factors such as the aging of the radiation source or detector, dirt on the moisture windows, etc. causing a loss of intensity, the on-sheet signal is multiplied by the ratio of the original signal amplitude to the current off-sheet signal amplitude, i.e., $$T_N = T * \frac{T_c}{T_s}$$

where
T = raw on-sheet transmission reading
$T_c$ = original off-sheet signal amplitude
$T_s$ = current off-sheet signal amplitude The second type of standardization is used to provide a relatively long term update of the moisture calibration. Large changes in the pulp composition, etc. can cause the transmission curves for FIG. 3 for a given dry weight to shift parallelly from their original readings as would be the case when a paper grade is run after an interval of three months. Thus, without a method of standardizing to take care of these effects, the water weight reading would be erroneous over a long term. Such shifts can be compensated, however, by using the difference of the basis weight at the wet end versus dry end to obtain the moisture removed (water weight). Although this way of measuring moisture is not a valid short term method because of time delays, as mentioned previously, it can remove the long term incremental water weight errors. The basis weight at the dry end may be converted to a bone dry basis weight as disclosed in the above Dahlin patent since the dry end moisture content is also known by another independent measurement. The basis weight measurement at the wet end is the sum of the paper weight (or bone dry basis weight) and the water weight. Thus, the difference between the basis weight of the wet end and the bone dry basis weight at the dry end provides an absolute indication of the true water weight for a given transmission of 1.7 micron radiation. As illustrated in FIG. 5 the characteristic curve 51 is now in effect standardized or provides standardized values since all measurements are related to the water weight at one specific point in time (standardization). Thus, if the moisture gauge gave a water weight $W_1$, whereas using the described subtractive basis weight technique a water weight of $W_2$ was obtained, then a value of $W_2 - W_1$ could be added to all future water weight readings for the wet end to provide absolute accuracy. This long term standardization need only be provided about every eight hours, or when a new grade of paper is run.

In the case of abnormal operating conditions where the dry end is not in operation the data base constants from the last valid standardization are used until the dryer is again operational. Also in some cases standardization could be feasible on an off-line basis.

From a theoretical standpoint in the present invention, it is believed that the differing physical phenomenon of scattering is utilized to provide measurement of water content as opposed to absorption. Scattering of the light occurs as a result of reflection and refraction off the surfaces of the paper. For a specific material, the loss of transmission from scattering of the light increases for increasing thicknesses. This causes paper to exhibit decreasing transmission as it becomes heavier, as shown in FIG. 2. As water is added to the paper in small quantities, the transmission of the paper at a given weight decreases. It is believed that the additional water causes additional scattering sites so that less of the incident light is able to get through. This is shown in the lower half of FIG. 2. However, as the amount of water in the paper increases and becomes a significant proportion of the weight of the substance, the water particles which when small caused increased scattering sites, are larger and there are less of them (because they have combined into the larger particles). This means that not only are there less water scattering sites, but also that the infusion of the water into the paper scattering sites causes increased scattering within the paper. This phenomenon, therefore, causes increased transmission of the light through the material as the material becomes increasingly wet. This phenomenon is illustrated in the upper portion of FIG. 2 and produces the positive slope characteristic.

From the explanation of scattering given above it can be seen that a transmission measurement wavelength which is not also affected by absorption is preferred. The absorption effect in general would hide the scattering phenomenon which is of interest. It is also clear that only one wavelength is necessary to measure scattering phenomena, not the two necessary for valid absorption measurement. The other required input is a signal (e.g., the total weight signal) separated in space from the moisture transmission signal which provides the second input for valid water weight measurement.

Thus, the present invention has provided an improved method of directly and immediately measuring water weight at high moisture levels.

What is claimed is:

1. A method for measuring the amount of moisture associated with a moving base material where said moisture is a significant proportion of the total weight of said base material such moisture having both radiation absorption and scattering characteristics comprising the following steps: directing infrared radiation of a single selected band at said material which is substantially insensitive to said absorption characteristic and relatively sensitive to said scattering characteristic;

measuring the amount of said radiation received from said material, said received radiation being proportional to said amount of moisture; and standardizing said measured amount of radiation to accommodate long term changes in conditions by making an independent on-line measurement at a location on said base material substantially different than the location where radiation is directed at said material.

2. A method as in claim 1 where said radiation is in a wavelength band centered around 1.7 microns.

3. A method as in claim 1 including the step of measuring total weight at said location and where said independent on-line measurement is made at a location where said moisture is relatively insignificant and includes the measurement of total weight and said moisture to obtain dry weight, the difference between said dry weight and total weight providing an absolute indication of moisture which is used to standardize.

4. A method for measuring the amount of moisture associated with a moving base material where said moisture is a significant proportion of the total weight of said base material such moisture having both radiation absorption and scattering characteristics comprising the following steps: directing infrared radiation of a single selected band at said material which is substantially insensitive to said absorption characteristic and relatively sensitive to said scattering characteristic; measuring the amount of said radiation received from said material, said received radiation being proportional to said amount of moisture; measuring the total weight of said material, which includes moisture and dry basis weight, at substantially the same location on said material where said radiation is directed; constructing a first family of characteristic curves relating said moisture to said amount of received radiation with said dry basis weight as a parameter; deriving from said first family of curves a second superimposed family of curves with said total weight as a parameter; relating said measured total weight to the corresponding total weight curve of said second family; and relating said measured amount of radiation to said corresponding total weight curve to obtain said amount of moisture.

5. A method as in claim 4 where said first family of curves is constructed off-line by (a) making a range of samples of base material to be measured, (b) placing the samples in containers of water for several hours and (c) drying the samples in varying degrees to provide a range of moisture contents.

6. A method as in claim 4 where said measured amount of radiation is related to said corresponding total weight curve by representing said family of total weight curves in terms of slope versus total weight and intercept versus total weight said amount of moisture being a function of the product of slope, at said measured total weight, and said measured amount of radiation added to said intercept at said measured total weight.

7. A method as in claim 4 including the step of standardizing said measured amount of radiation to accommodate long term changes in conditions by making an independent on-line measurement at a location on said base material substantially different than the location where radiation is directed at said material.

* * * * *